April 23, 1957 D. S. CAMPBELL 2,789,811
CUSHIONING DEVICE FOR RAILROAD CARS
Filed July 16, 1953 2 Sheets-Sheet 1
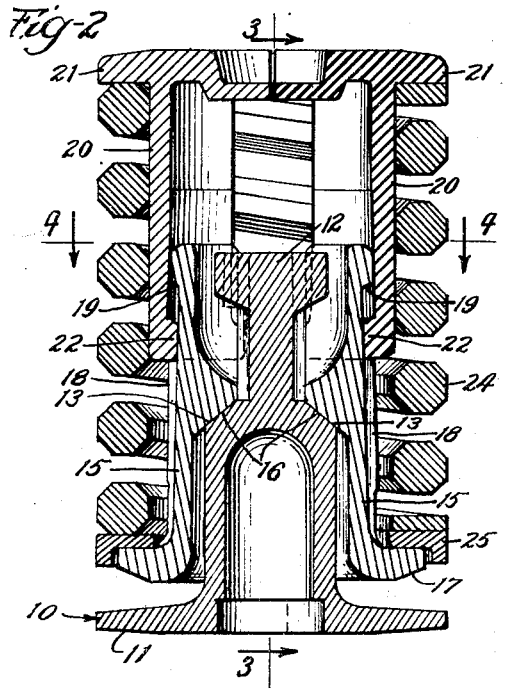
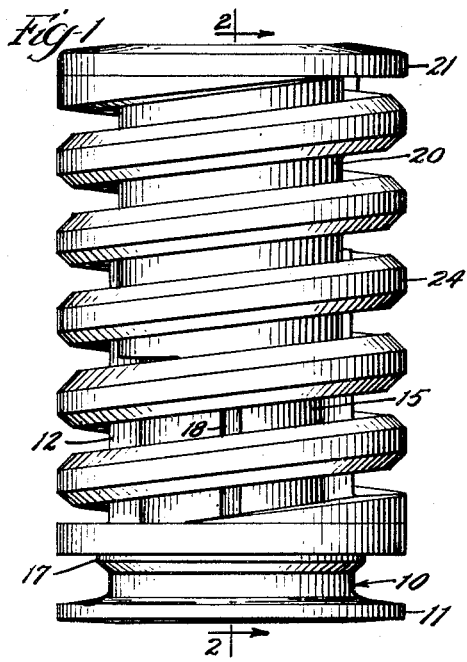
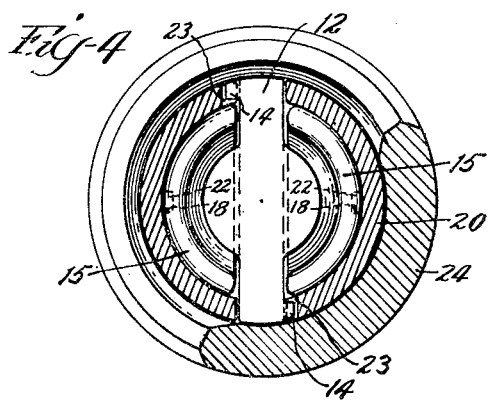
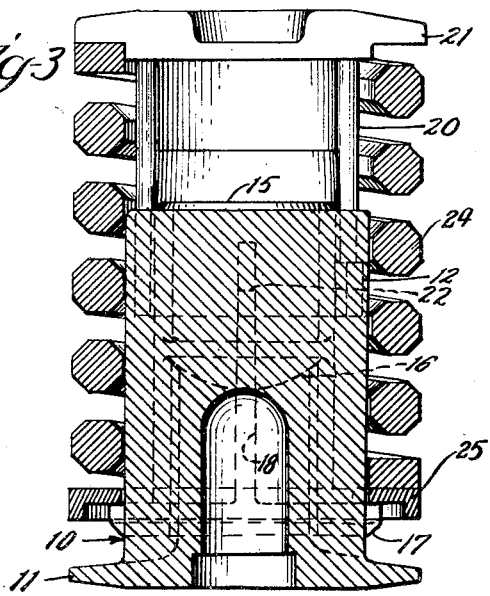
INVENTOR
David S. Campbell
BY
Mann, Brown and Hansmann
Attys.

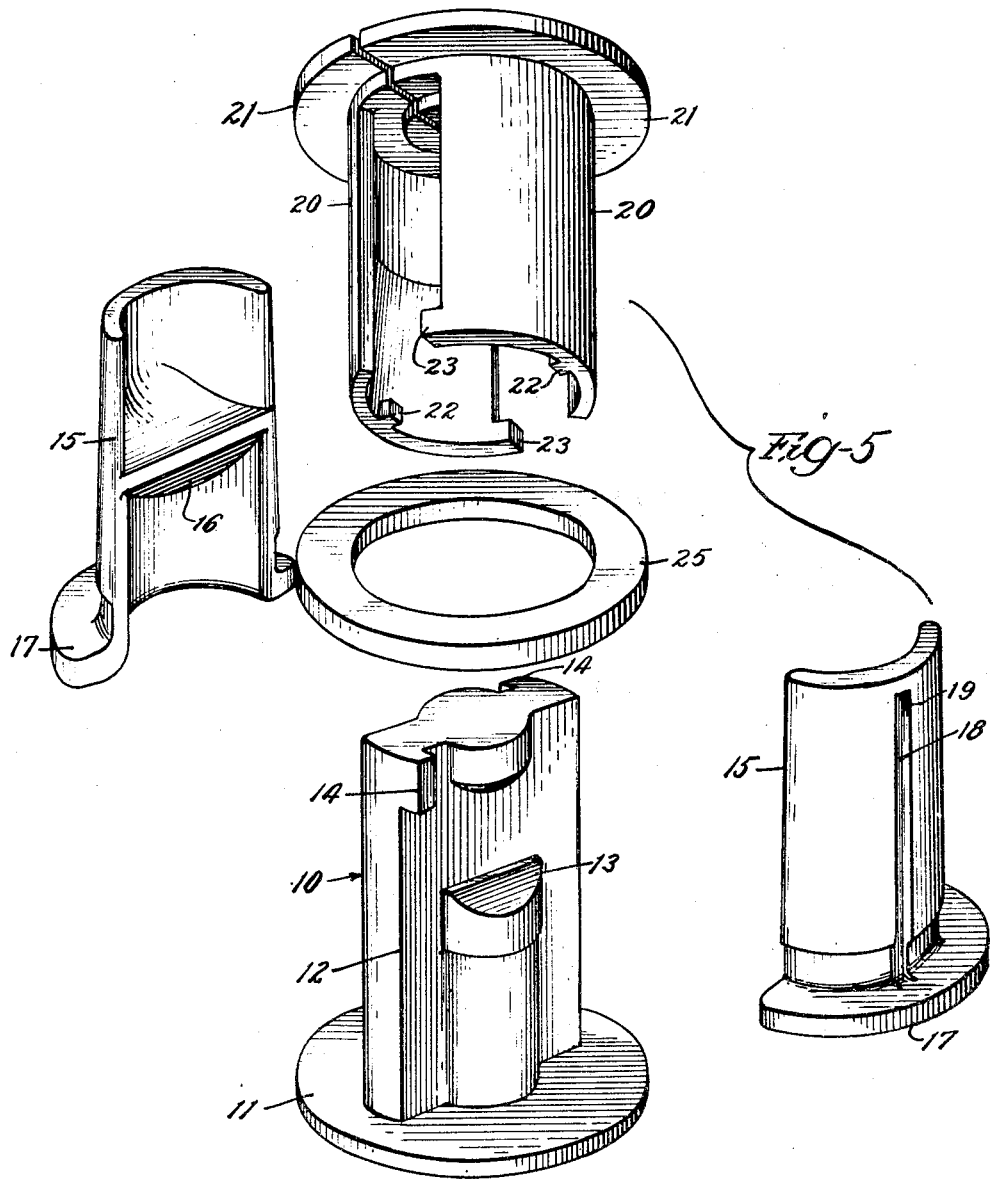

United States Patent Office 2,789,811
Patented Apr. 23, 1957

2,789,811

CUSHIONING DEVICE FOR RAILROAD CARS

David S. Campbell, Glen Ellyn, Ill., assignor to Cardwell Westinghouse Company, a corporation of Delaware Application July 16, 1953, Serial No. 368,257

4 Claims. (Cl. 267—9)

This invention relates to cushioning devices for railroad cars, and has for its principal object to simplify and improve the construction and operation of the cushioning devices disclosed in the patent to Sproul No. 2,084,283, June 15, 1937, specifically by changing the thrust or friction post 11, the friction shoes 26 and 27, and the friction members 36 and 37, and omitting the retaining bolt 25, etc.

In the drawings:

Fig. 1 is a side elevation of the improved cushioning device;

Fig. 2 is a vertical section on the line 2—2 of Fig. 1;

Fig. 3 is a vertical section on the line 3—3 of Fig. 2;

Fig. 4 is a cross-section on the line 4—4 of Fig. 2; and

Fig. 5 is a perspective view of the post, the friction shoes, the friction members, and the spring seat displaced from their positions in the cushioning device.

But the drawings and the corresponding description are used for the purpose of illustrative disclosure only, and are not intended to impose unnecessary limitations on the claims.

The thrust post or friction post generally indicated by 10 includes a base 11 and a generally flat post 12 on the base having opposed wedge faces 13 on the intermediate portion of the post and oppositely directed overhanging shoulders 14 adjacent to the upper corners of the post.

Associated with the post are a pair of friction shoes generally indicated by 15, each having an inner wedge surface 16 adapted for frictional contact with the corresponding wedge face 13 on the post, an outwardly directed bottom flange 17, and a groove 18 in the mid portion of the outer side running upwardly from the flange 17 to a stop 19 adjacent to the top of the friction shoe.

On the outer side of the friction shoes are a pair of friction members 20 in frictional contact with the outer circular walls of the friction shoes, and each having an outwardly directed top flange 21, an inner key 22 to be received in the corresponding groove 18, and a laterally directed lug 23 for cooperation with the corresponding overhanging shoulder 14 on the post 10.

A helical spring generally indicated by 24 surrounds the friction members and friction shoes and extends between the outwardly directed bottom flanges on the shoes and the outwardly directed top flanges on the friction members, there being a spring seat 25 between the lower end of the spring 24 and the flanges 17 on the friction shoes.

In operation under load or compression, the friction surfaces 16 acting upon the friction faces 13 move the friction shoes outwardly into engagement with the friction members, and they in turn move outwardly into engagement with the inner surface of the spring 24.

The outer surfaces of the friction shoes and the inner surfaces of the friction members are inclined to increase the resistance to compression as the parts move toward closed position. Thus, the resistance of the spring is augmented by the friction between the friction shoes and the friction members and between the friction members and the spring. By appropriate choice of slopes and surfaces, the cushioning device can be given any desired increase or variance in resistance. Normally, it is made to replace one of the springs in the standard spring set.

As shown here, the post or thrust member is on the bottom, but the action is substantially the same when reversed.

In assembling the parts shown in Fig. 5 together with the spring 24, the spring is telescoped over the friction members assembled as shown in the upper part of Fig. 5. The friction shoes 15 are then set on the friction post 10 loosely and the spring seat 25 dropped over them. Then the two sub-assemblies are brought together with the lugs 23 approximately 90 degrees away from the shoulders 14. The spring is compressed, and the sub-assemblies rotated to bring lugs 23 under the shoulders 14, and the spring is released. The assembly then becomes a commercial unit for handling, shipping, and use.

I claim:

1. In a cushioning device for railroad cars, a friction post including a base, a generally flat post on the base having opposed wedge faces on the intermediate portions of the post, and oppositely directed overhanging shoulders adjacent to the top of the post, friction shoes having inner wedge surfaces engaging the opposed wedge faces of the post, outwardly directed bottom flanges, and grooves on their outer sides above the bottom flanges, friction members engaging the outer sides of said friction shoes having outwardly directed top flanges, inner keys received within the grooves in the friction shoes, and laterally directed lugs under the overhanging shoulders on top of the post, and a helical spring around the friction members and friction shoes between the respective, outwardly directed bottom flanges on the shoes and the outwardly directed top flanges on the friction members.

2. In a cushioning device for railroad cars, a friction post including a base, a generally flat post on the base having opposed wedge faces on the intermediate portions thereof, and oppositely directed overhanging shoulders adjacent to the top of the post, friction shoes having inner wedge surfaces engaging the opposed wedge faces of the post, outwardly directed bottom flanges, and grooves on their outer sides above the bottom flanges, friction members engaging the outer sides of said friction shoes, said friction members having outwardly directed top flanges, said friction members carrying integral inner keys and laterally directed lugs, said inner keys being received within the grooves in the friction shoes, said laterally directed lugs being positioned under the overhanging shoulders, and a helical spring around the friction members and friction shoes between the respective outwardly directed bottom flanges on the shoes and the outwardly directed top flanges on the friction members.

3. In a cushioning device for railroad cars including a friction post having a base and a generally flat post on the base having opposed wedge surfaces, friction shoes having inner wedge surfaces engaging the opposed wedge faces of the post and outwardly directed bottom flanges, friction members engaging the outer sides of the friction shoes and having outwardly directed top flanges, and a helical spring around the friction members and friction shoes, the improvement wherein the post is provided with oppositely directed overhanging shoulders adjacent the top thereof and the friction members are provided with laterally directed lugs under said shoulders, and wherein the friction shoes and the friction members are provided with key and groove inter-engaging means.

4. In a friction member, for a device of the type described, including a generally semi-cylindrical body formed with convex-concave surfaces and axially extending edges, and an outwardly directed flange fixed to said body at one end thereof, the improvement wherein the body is formed at the other end thereof with a single lug projecting from one edge thereof, said lug having a radius of curvature equal to that of said body, and wherein said body is also formed with a projecting key element spaced from said lug, said key being relatively small in size and being positioned at said other end of said body.

References Cited in the file of this patent

UNITED STATES PATENTS

| | | |
|---|---|---|
| 1,696,478 | Hall | Dec. 25, 1928 |
| 1,753,937 | Nash | Apr. 8, 1930 |
| 2,128,504 | Sproul | Aug. 30, 1938 |
| 2,335,847 | Dath | Dec. 7, 1943 |
| 2,355,783 | Dorey | Aug. 15, 1944 |
| 2,512,016 | Haseltine | June 20, 1950 |
| 2,532,363 | Haseltine | Dec. 5, 1950 |